(12) United States Patent
Miller

(10) Patent No.: US 9,792,463 B2
(45) Date of Patent: Oct. 17, 2017

(54) COMBINATION MAGNETIC STRIPE AND CONTACTLESS CHIP CARD READER

(76) Inventor: Kenneth L. Miller, San Pedro, CA (US)

( * ) Notice: Subject to any disclaimer, the term of this patent is extended or adjusted under 35 U.S.C. 154(b) by 418 days.

(21) Appl. No.: 13/136,281

(22) Filed: Jul. 28, 2011

(65) Prior Publication Data

US 2013/0026218 A1    Jan. 31, 2013

(51) Int. Cl.
| | |
|---|---|
| G06K 7/00 | (2006.01) |
| G07F 19/00 | (2006.01) |
| G06F 19/00 | (2011.01) |
| G06K 17/00 | (2006.01) |

(52) U.S. Cl.
CPC ........... *G06K 7/0004* (2013.01); *G06F 19/00* (2013.01); *G06K 7/00* (2013.01); *G06K 7/0043* (2013.01); *G07F 19/00* (2013.01); *G07F 19/205* (2013.01); *G06K 2017/0067* (2013.01)

(58) Field of Classification Search
CPC ........ G06K 7/004; G06K 7/00; G06K 7/0043; G06K 7/0056; G06K 2017/0067; G07F 19/205; G07F 19/00
See application file for complete search history.

(56) References Cited

U.S. PATENT DOCUMENTS

| | | | | |
|---|---|---|---|---|
| 4,141,494 A | * | 2/1979 | Fisher | ........................... 235/449 |
| 4,254,441 A | * | 3/1981 | Fisher | ........................... 360/88 |
| 4,345,168 A | * | 8/1982 | Fisher | ........................... 327/58 |
| 4,390,968 A | * | 6/1983 | Hennessy | ............. G07F 19/201 235/379 |
| 4,742,215 A | * | 5/1988 | Daughters et al. | ........... 235/487 |
| 5,544,728 A | * | 8/1996 | Dabrowski | .................... 194/206 |
| 5,594,233 A | * | 1/1997 | Kenneth et al. | ............... 235/492 |
| 6,085,081 A | * | 7/2000 | Leskinen | ....................... 455/406 |
| 6,505,774 B1 | * | 1/2003 | Fulcher et al. | ................ 235/381 |
| 6,533,659 B2 | * | 3/2003 | Seymour et al. | ............... 463/16 |
| 6,852,029 B2 | * | 2/2005 | Baltz et al. | ..................... 463/25 |
| 7,004,385 B1 | * | 2/2006 | Douglass | ...................... 235/379 |

(Continued)

OTHER PUBLICATIONS http://www.ylk-ic.com/MSR606%20Programmer's%20Manual.pdf, MSR606 Programmers Manual, Jun. 1, 2009.*

(Continued)

*Primary Examiner* — Daniel Walsh
(74) *Attorney, Agent, or Firm* — Nixon Peabody LLP; Jeffrey L. Costellia

(57) ABSTRACT

A combination magnetic-stripe card reader with integrated contact-less chip card read/write functions, a direct replacement for a standard player tracking magnetic-stripe card reader installed in slot machines. It is a form, fit and function for existing player tracking readers, having the same front panel appearance, the same physical envelope, using the same mounting method, using the same cable connections and operating in the identical manner. The combined functions requires two command sets and a method to distinguish between them, the legacy command set of the existing reader to be replaced which is typically strings of American Standard Code for Information Interchange (ASCII) eight bit characters with a line terminator character and the contact-less chip card requiring the ability to send and receive all possible eight bit values with varying length commands and not having a dedicated character value to indicate the end of a command.

20 Claims, 5 Drawing Sheets

(56) References Cited

U.S. PATENT DOCUMENTS

| | | | |
|---|---|---|---|
| 7,206,544 B2* | 4/2007 | Forrest | 455/41.2 |
| 7,247,098 B1* | 7/2007 | Bradford et al. | 463/47 |
| 7,284,692 B1* | 10/2007 | Douglass | 235/379 |
| D559,253 S | 1/2008 | Arakaki | |
| D586,813 S | 2/2009 | Colburn | |
| 7,562,815 B2 | 7/2009 | Page | |
| 7,584,885 B1* | 9/2009 | Douglass | 235/379 |
| 7,597,250 B2 | 10/2009 | Flinn | |
| 7,607,583 B2* | 10/2009 | Berardi et al. | 235/487 |
| 7,992,776 B1* | 8/2011 | Ramachandran et al. | 235/379 |
| 8,175,832 B2* | 5/2012 | So | 702/85 |
| 8,540,142 B1* | 9/2013 | Lewis | G06Q 40/02 235/379 |
| 2002/0083318 A1* | 6/2002 | Larose | 713/164 |
| 2002/0145051 A1* | 10/2002 | Charrin | G06K 7/0004 235/492 |
| 2003/0007321 A1* | 1/2003 | Dayley | G06F 1/181 361/679.6 |
| 2003/0027631 A1* | 2/2003 | Hedrick | G07F 17/0014 463/29 |
| 2003/0052159 A1* | 3/2003 | Kawan | G06K 7/0004 235/375 |
| 2003/0057276 A1* | 3/2003 | Appalucci et al. | 235/382 |
| 2003/0218066 A1* | 11/2003 | Fernandes et al. | 235/449 |
| 2004/0016796 A1* | 1/2004 | Hanna et al. | 235/375 |
| 2004/0045330 A1* | 3/2004 | Moon et al. | 70/107 |
| 2004/0053695 A1* | 3/2004 | Mattice et al. | 463/42 |
| 2004/0215693 A1* | 10/2004 | Thompson | 709/201 |
| 2004/0217169 A1* | 11/2004 | von Mueller et al. | 235/449 |
| 2005/0003890 A1* | 1/2005 | Hedrick | G07F 17/0014 463/29 |
| 2005/0023349 A1* | 2/2005 | Isono et al. | 235/449 |
| 2005/0116036 A1* | 6/2005 | Akahane et al. | 235/449 |
| 2005/0139652 A1* | 6/2005 | Iwamura | 235/380 |
| 2005/0167496 A1* | 8/2005 | Morley et al. | 235/449 |
| 2005/0218227 A1* | 10/2005 | Takita et al. | 235/441 |
| 2005/0247787 A1* | 11/2005 | Von Mueller et al. | 235/449 |
| 2006/0027644 A1* | 2/2006 | Takashi et al. | 235/380 |
| 2006/0073883 A1* | 4/2006 | Franks | 463/25 |
| 2006/0131396 A1* | 6/2006 | Blossom | 235/380 |
| 2006/0131410 A1* | 6/2006 | Fernandes et al. | 235/449 |
| 2006/0157565 A1* | 7/2006 | Shiomi | 235/440 |
| 2006/0169764 A1* | 8/2006 | Ross | G07F 19/20 235/375 |
| 2006/0180666 A1* | 8/2006 | Yamashita et al. | 235/451 |
| 2006/0258422 A1* | 11/2006 | Walker et al. | 463/7 |
| 2006/0287964 A1 | 12/2006 | Brown | |
| 2007/0080231 A1* | 4/2007 | Tadamasa | 235/475 |
| 2007/0242039 A1* | 10/2007 | Chen et al. | 345/157 |
| 2008/0009336 A1* | 1/2008 | Walker et al. | 463/16 |
| 2008/0011850 A1* | 1/2008 | Henry | 235/441 |
| 2008/0026822 A1* | 1/2008 | Walker et al. | 463/25 |
| 2008/0067246 A1* | 3/2008 | Clark et al. | 235/439 |
| 2008/0090645 A1* | 4/2008 | Walker et al. | 463/25 |
| 2008/0106390 A1* | 5/2008 | White | 340/426.11 |
| 2008/0149832 A1* | 6/2008 | Zorn | 250/311 |
| 2008/0203163 A1* | 8/2008 | Wakabayashi et al. | 235/449 |
| 2008/0276326 A1* | 11/2008 | Bhansali et al. | 726/36 |
| 2009/0005176 A1* | 1/2009 | Morrow et al. | 463/43 |
| 2009/0029766 A1* | 1/2009 | Lutnick et al. | 463/29 |
| 2009/0065577 A1* | 3/2009 | Shiomi | 235/380 |
| 2009/0093300 A1* | 4/2009 | Lutnick et al. | 463/26 |
| 2009/0108061 A1* | 4/2009 | Tartavull et al. | 235/380 |
| 2009/0275399 A1* | 11/2009 | Kelly et al. | 463/27 |
| 2009/0280911 A1* | 11/2009 | Tsao | 463/46 |
| 2010/0033307 A1* | 2/2010 | Narendra et al. | 340/10.1 |
| 2010/0285869 A1* | 11/2010 | Walker et al. | 463/25 |
| 2011/0065490 A1* | 3/2011 | Lutnick | G07F 17/32 463/16 |
| 2011/0068171 A1* | 3/2011 | Hsieh | 235/380 |
| 2011/0220718 A1* | 9/2011 | Dixon et al. | 235/382.5 |
| 2012/0092786 A1* | 4/2012 | Takeuchi | G06K 7/10465 360/2 |
| 2012/0199653 A1* | 8/2012 | Wenzel | 235/382 |
| 2012/0283003 A1* | 11/2012 | O'Donnell | 463/25 |
| 2013/0026218 A1* | 1/2013 | Miller | G06K 7/0004 235/375 |
| 2013/0087614 A1* | 4/2013 | Limtao et al. | 235/449 |
| 2014/0081874 A1* | 3/2014 | Lewis et al. | 705/72 |
| 2014/0166745 A1* | 6/2014 | Graef et al. | 235/379 |
| 2014/0217169 A1* | 8/2014 | Lewis et al. | 235/379 |
| 2015/0287289 A1* | 10/2015 | Lewis | G07F 19/201 235/379 |
| 2017/0092062 A1* | 3/2017 | Tsutsui | G07F 17/3246 |

OTHER PUBLICATIONS http://www.idinnovations.com/downloads/MagStripe%20Manual.pdf, programmable Magnetic Stripe Reader, 1996.*
http://www.adafruit.com/datasheets/PN532C106_Application%20Note_v1.2.pdf, AN10609_3, Jan. 5, 2010.*
"13.56 MHz Type B RF Reader Specification", Mar. 2009, available online at http://www.atmel.com/Images/doc8547.pdf.
"AT88RF1354 Reader Block", Nov. 6, 2008, available online at http://www.atmel.com/Images/AT88RF1354_ModuleSchemAndLayout.pdf.

* cited by examiner

COMBINATION MAGNETIC STRIPE AND CONTACTLESS CHIP CARD READER

FIELD OF THE INVENTION

This invention pertains to casino gaming in particular to the retrofitting of slot machines to add cashless gaming ability by replacing the existing player tracking magnetic stripe card reader with a combination magnetic stripe card reader with integrated contact-less chip card read/write functions. This combined function device greatly reduces the cost of adding the cashless gaming to a slot machine, by not requiring modification to the cabinet or internal cabling. Also, from the player's standpoint the operation of the player tracking reader appears to be unchanged, as the tactile feel is the same and it accepts all the existing magnetic stripe player cards. The new cashless gaming ability will only become apparent when a player inserts a contact-less chip card. This invention further yields benefits in that a casino need not convert all machines at once but can operate with both cashless gaming and player tracking only, the chip card used is dimensionally the same as the existing player cards thereby allowing all the existing card handling and printing equipment to also process the new chip card without modification or replacement.

BACKGROUND OF THE INVENTION

Traditionally a slot machine was a stand-alone betting device that accepted coins as the wager and likewise paid out winnings in coins by dumping the won amount into a coin tray at the base of the machine. This required that the machine store the coins wagered and also have a sufficient number of coins to pay the winnings. If the machine received more coins than could be stored, it had to be opened up and the coins removed. Also if the won amount exceeded the number of coins in the machine the player had to be paid in person and coins added to the machine. This can be quite labor intensive considering that many casino floors may have as many as 1500 to 2000 machines. This gave raise to thoughts of cashless gaming.

Over the years the types of games that were popular changed. Initially gaming was table games but as time went on machine based games became accepted by more players. As the popularity increased the percentage of the gaming revenue also increased to the point that many casinos installed player-tracking systems to determine the type of player playing the machines and to better serve those players. The player-tracking system needed a way to ID a particular player and cards were chosen, some with punched holes but mainly magnetic strip cards. Now that the machine based gaming represents more than 50% of the casino's revenue, most every casino has a player tracking system.

In recent years with advances in electronics cashless gaming systems have started to be installed some that are account based with the card serving as a means of ID and others using paper coupons. The account-based system uses a magnetic strip card, which is linked to an account stored in a back room computer in much the same way as a debit card is in automatic teller machine (ATM) systems. Winnings and losses are transmitted over a local area network with the accounting being performed by the back room computer. While a coupon, sometimes referred to as "ticket-in ticket-out", system a printed coupon (the Ticket) is optically read to put the printed value into the machine, so the player can place a wager. When the player desires to end the play session by cashing out, the system prints the winnings or money still in the machine on a paper coupon. This system has the potential to run stand-alone, but the ease of duplicating printed coupons requires a back room computer to monitor the coupons in circulation. The above systems both require an expensive network and back room computer. The coupon system, in addition, must have a coupon reader and coupon printer, requiring paper and ribbons, in each slot machine.

Now there is an effort to make a cashless gaming system truly stand-alone or least with minimal monitoring. Some systems have looked to the financial chip cards (smart cards) as a solution and using available combination readers designed for the banking industry. While they work there are some draw backs, the cards use metallic contacts to communicated with the chip and the combination readers were really not designed for the casino environment. The commercially available combination readers being designed to read bank cards read the full length of the card requiring that it protrude further out the front of the slot machine and requires a panel cutout and mounting not compatible with existing slot machines. But the real issue is the contacts in the reader itself cannot hold up to spilled drinks and cigarette ashes ever present in the casino environment.

The next generation cashless gaming will be able to run stand-alone (no back room computer and network), requires no consumables such as paper and needs little or no maintenance.

The following discloses an embodiment of a device, which provides a major step towards the next generation.

OBJECTS OF THE INVENTION

The goal of this invention is to ease the transition of existing slot machine designs to add cashless gaming capability.

Accordingly the object of this invention is to fit into the same physical envelope as the existing player tracking magnetic stripe reader.

A further object of this invention is to have the operation and tactile feel to be identical to existing player tracking magnetic stripe readers.

Another further object of this invention is to connect electrically to the existing wiring harness of the slot machine.

Another further object of this invention is to read magnetic stripe player tracking cards and also read and write to contact-less chip cards.

Another further object of this invention is to accept both the legacy commands of existing player tracking magnetic stripe reader and the commands of the contact-less card interface used for the cashless gaming functions.

Another further object of this invention is for the cashless gaming functions to be immune to typical contamination sources found in the casino environment.

Another further object of this invention is to limit the modification required to an existing slot machine to a software up-grade, which adds the cashless gaming functions.

DETAILED DESCRIPTION OF THE INVENTION

The preferred embodiment of this invention is designed for use in slot machines.

Figure 1:
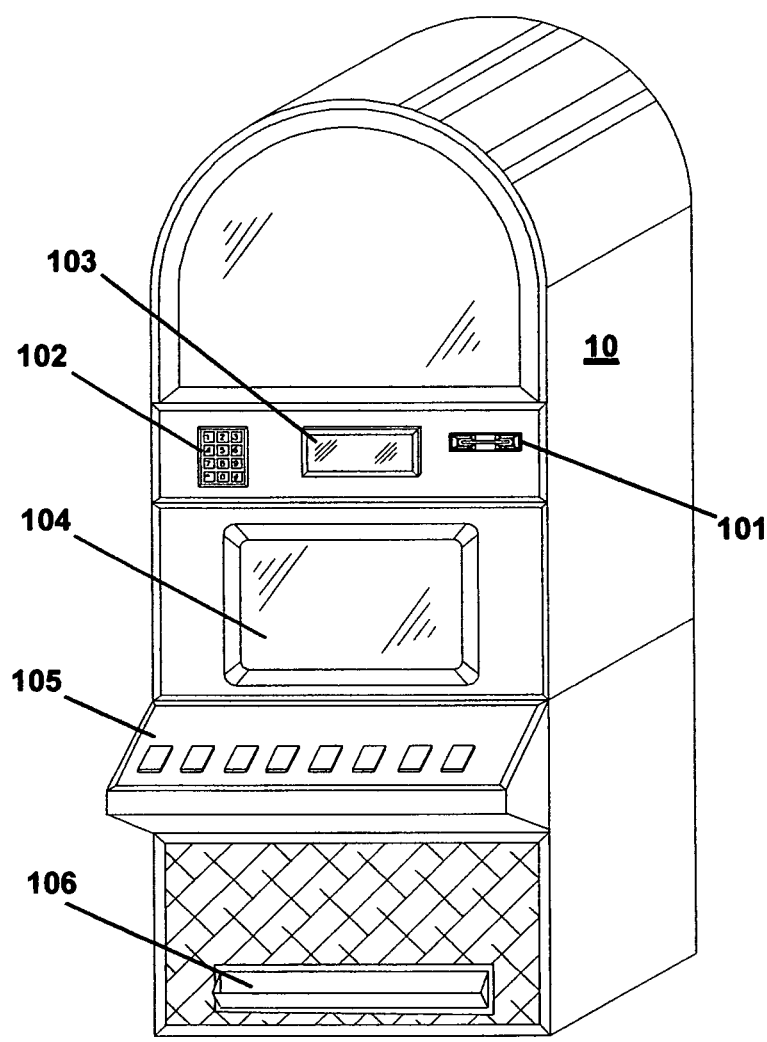
FIG. 1 is a view of a typical slot machine showing the locations of various installed devices including the player tracking reader.

FIG. 1 shows a typical slot machine 10 with the typical complement of player tracking and player interface devices. The player tracking system typically includes a player tracking card reader 101 to read the player's magnetic stripe ID card, a player information display 103 to display the player's name and reward points and a keypad 102 to enter a PIN number. The player interacts with the slot machine via a player input interface 105 comprised of multiple buttons to enter differing wager amounts and to initiate the game play, and a game display 104 to show the game action and results. The game display 104 may be an electronic screen or mechanical reels. Winnings are dispensed to the player via a coin tray 106 at the base of the slot machine 10.

Figure 2:
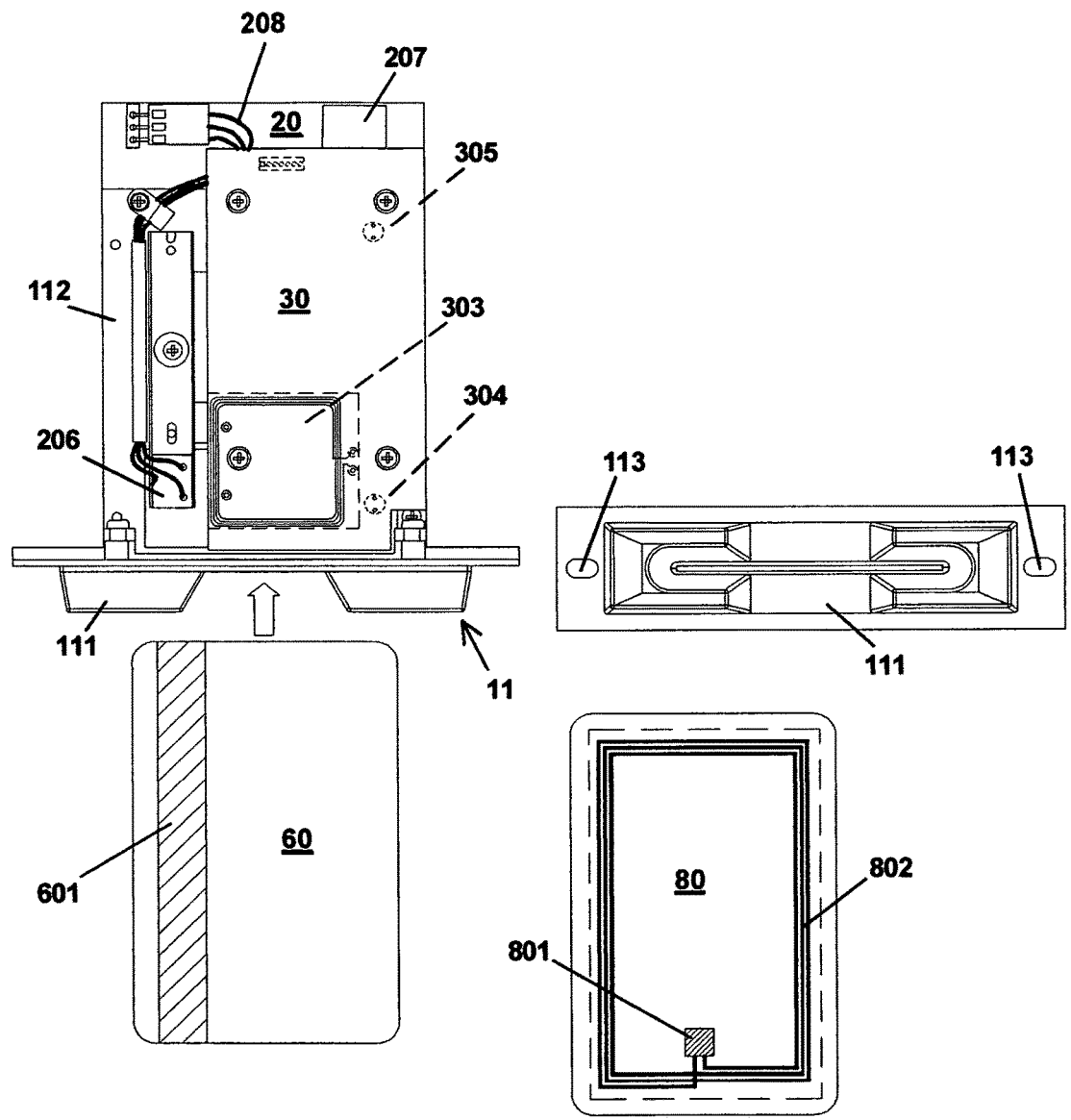
FIG. 2 shows the top view of the combination magnetic strip reader with the contact-less interface board, the front bezel, the antenna location and the magnetic strip card.

FIG. 2 shows the top view of a combination magnetic strip reader 11 with a contact-less interface board 30 mounted on top and a magnetic stripe reader electronics board 20 mounted on the bottom. A player tracking magnetic stripe card 60 is shown with magnetic stripe 601 in alignment for reading by a magnetic head 206 part of combination reader 11. The head 206 is electrically connected to the reader electronics 20 via a set of head wires 208. Also shown is a contact-less chip card 80 with a contact-less chip 801 and a coupling antenna 802 which are imbedded within the card. For communication with contact-less cards a loop-coupling antenna 303 is located under the contact-less interface board 30. Also on board 30 is a pair of card position infrared (IR) sources 304 and 305 aligned facing a set of card position sensors 204 and 205 on board 20. Loop-coupling antenna 303 is positioned near the centerline of the reader body 112 as near the card entrance as possible. The infrared sources 304 and 304 are positioned such that an inserted card will pass between them and the card position sensors 204 and 205.

Figure 2A:
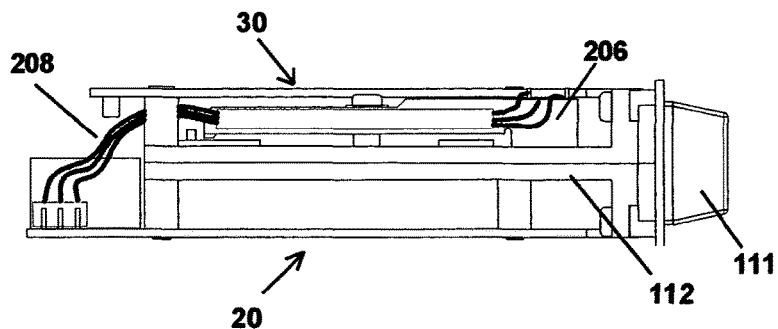
FIG. 2A shows the view of the magnetic stripe read head side of the combination magnetic strip reader.

FIG. 2A shows the magnetic head 206 side of combination reader 11 with the magnetic stripe reader electronics 20 mounted on the bottom and the contact-less interface board 30 mounted on top.

Figure 2B:
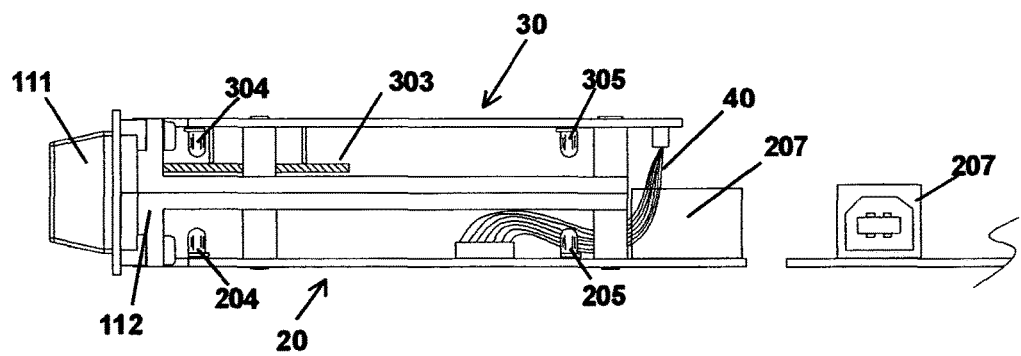
FIG. 2B shows the view of the contact-less interface board side of the combination magnetic strip reader with the card detects, interconnect cable and I/O connector to slot controller/host.

FIG. 2B shows the side with the card position sensors, 204 at the entry and 205 at the rear on the magnetic stripe reader electronics 20 in alignment with the card position infrared (IR) sources 304 entry and 304 at the rear on the contact-less interface board 30. Also shown is the loop coupling antenna 303 positioned approximately one third the distance from the centerline of the reader body 112 to the contact-less interface board 30. The stripe reader electronics 20 and contact-less interface board 30 are electrically interconnected via a wire assembly 40. Located on the stripe reader electronics 20 is a connector 207, which provides the connection to the slot machine controller 70. In this embodiment connector 207 is a USB (Universal Serial Bus) type connector. The interface connector 207 type required to mate with a given slot controller 70 varies between slot machines depending on the interface type and protocol used.

The new combination reader 11 is designed to be mounted in the slot machine 10, shown in FIG. 1, in the same manner and place as the magnetic stripe only reader 101 with the bezel 111 protruding through the same rectangular cutout in the front panel and by the same screws, not shown, using a pair of mounting holes 113 in the bezel 111.

Figure 3:
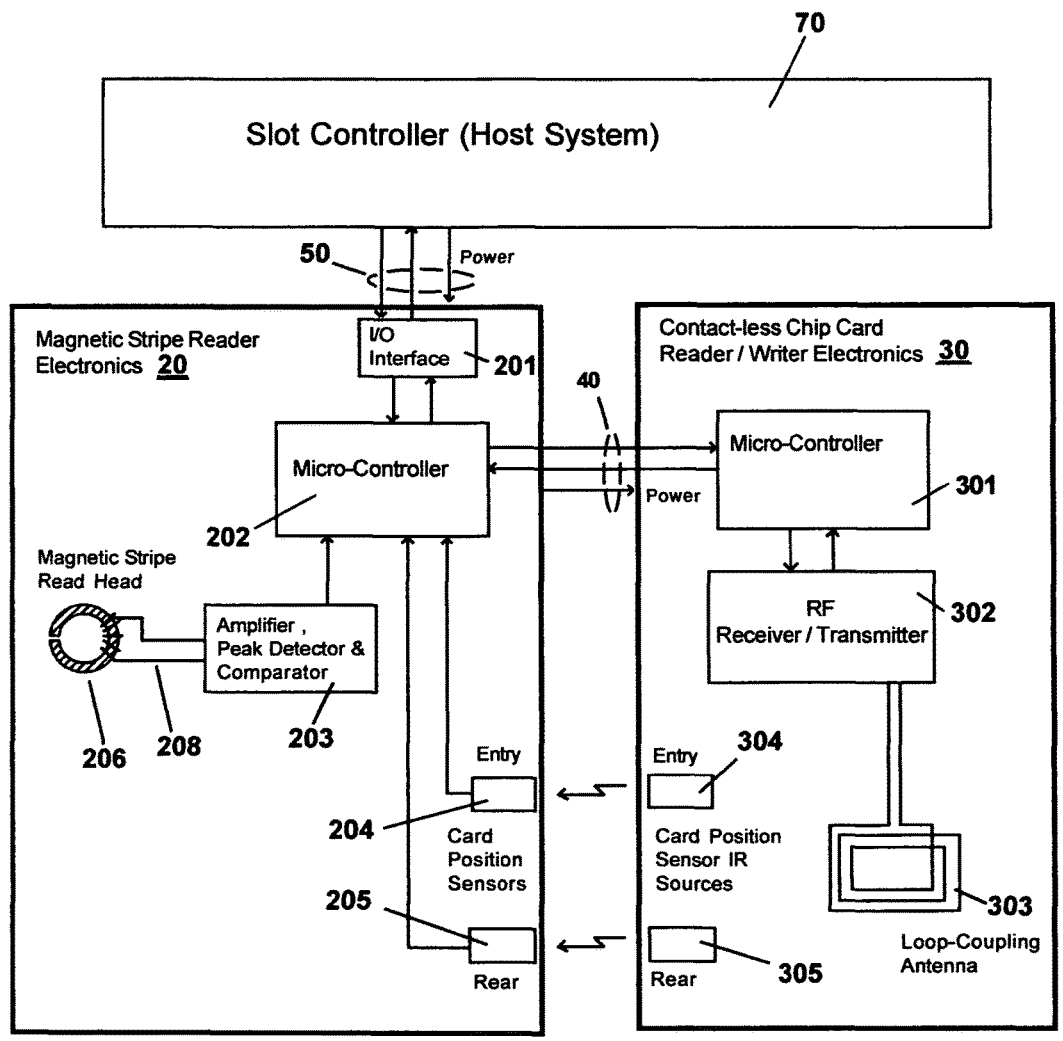
FIG. 3 shows a block diagram of the combination magnetic strip reader.

FIG. 3 shows the functional organization of the invention and the relationship between the functional elements. A slot controller 70 (not part of the invention) controls the operation of the slot machine and interfaces with an existing player tracking reader 101, and with only a software up-grade becomes able to interface with the combination reader 11. The slot controller 70 communicates with and supplies power to the magnetic stripe reader electronics 20 via interface cable 50 part of the exiting slot machine cable harness. Typically cable 50 is comprised of four wired connections: power (+5V), ground (0V), data to the reader and data from the reader. An I/O interface 201 sends to and receives data from the slot controller 70. The I/O interface 201 may be a variety of types, TTL (+5V/0V) level interface, RS-232 (+V/−V) or USB.

The magnetic stripe reader electronics 20 has a micro-controller 202 which process the magnetic stripe reader commands, detects then routes contact-less chip card commands, monitors the card position and decodes the data stream recovered from a magnetic stripe.

The magnetic stripe read head 206 is connected to the amplifier, peak detector and comparator 203 via head wires 208 consisting of three wires, two connected to the read winding and one to ground the head case to reduce noise pickup. A combination of amplifier, peak detector and comparator 203 converts the raw head signal to logic levels for micro-controller 202.

The card position sensors, entry 204 and rear 205 detect the card position, the entry sensor 204 signals micro-controller 202 when a card is detected at the entry and likewise the rear sensor 205 signals then a card is at the rear (fully inserted). In the preferred embodiment card position sensors 204 and 205 each are a phototransistor facing infrared light sources, with the collector connected to a pull-up resistor (not shown) resulting in a high logic level when a card is in position blocking the light.

Magnetic stripe reader electronics 20 connects to the contact-less chip card reader/writer electronics 30 via the wire assembly 40, which supplies at a minimum: power (+5V), ground (0V), data in and data out. Additional signals from the magnetic stripe reader electronics 20 to the contact-less chip card reader/writer electronics 30 may include, a busy output (not ready for contact-less card response), a clear to send input (ready for contact-less card command) and a contact-less chip card detected input.

A micro-controller 301 on the contact-less chip card reader/writer electronics 30 processes the contact-less card commands and communicates with a RF receiver/transmitter 302. The RF receiver/transmitter 302 is connected to the loop-coupling antenna 303, constructed on a separate printed circuit board. In the preferred embodiment of the invention the RF receiver/transmitter 302 was chosen to operate at 13.56 Mhz, an Atmel Corporation AT88RF1354 is used, and the loop-coupling antenna 303 is four turns of a 0.014 inch wide trace with 0.006 air gap between turns and outside dimensions of 1.050 inches by 1.050 inches on a printed circuit board. The card position sensor IR (infrared) sources 304 and 305 are both constructed using infrared emitting diodes powered by current limiting resistor (not shown) connected to the supply voltage (+5V).

REFERENCE NUMERALS 10 slot machine
101 player tracking reader
102 keypad
103 player information display
104 game display
105 player input interface
106 coin tray
11 combination magnetic strip reader
111 bezel
112 reader body
113 mounting holes
20 magnetic stripe reader electronics
201 I/O interface
202 micro-controller
203 amplifier, peak detector & comparator
204 card position detector, entry
205 card position detector, rear
206 magnetic head
207 connector
208 head wires
30 contact-less chip card reader/writer electronic
301 micro-controller
302 RF receiver/transmitter
303 loop-coupling antenna
304 card position infrared source, entry
305 card position infrared source, rear
40 wire assembly
50 interface cable
60 magnetic stripe card
601 magnetic stripe
70 slot controller
80 contact-less chip card
801 chip
802 coupling loop antenna Operation of the Invention When a card, either magnetic stripe card 60 or contact-less chip card 80 is inserted into the combination reader 11 the entry card position sensor 204 will signal that a card has entered. The micro-controller 202 will first attempt to read a magnetic stripe card, when the rear position sensor 205 signals the card is fully inserted it will then proceed with processing the magnetic stripe data if encode data was present. After which the micro-controller 202 can then activate the contact-less chip card reader/writer electronics 30 to check if the card contains a contact-less chip. Shown in FIG. 2, FIG. 2A and FIG. 2B.

When the magnetic stripe card 60 is inserted into the combination reader 11 with the magnetic stripe 601 aligned as shown in FIG. 2 in a continuous motion. The encoded data on the magnetic stripe 601 is recovered by the magnetic stripe reader electronics 20 in FIG. 3.

First the magnetic stripe read head 206 senses the flux reversals, the change of the magnetic polarity, encoded on the magnetic stripe 601 and outputs them as positive and negative peaks typically in the mV (millivolt) range. The output signal from read head 206 is sent to the amplifier, peak detector and comparator 203 via head wires 208.

The amplifier in 203 increases the head signal to volt levels, the peak detector in 203 detects the peaks by either differentiating or integrating the signal producing a zero crossing for each peak referenced to a Q-point bias voltage, usually 50% of the supply voltage. The comparator in 203 referenced to the same Q-point voltage further processes the signal from peak detector 203, and outputs a high logic level (+5V) then the signal is above the Q-point voltage and a low logic level (0V) then below. The comparator output is then sent on to the micro-controller 202 for decoding and subsequent storage in memory.

The micro-controller 202 is alerted by the entry card position sensor 204, going to a high logic level (+5V), that a card has entered the reader and to prepare to start decoding the data stream from the comparator in 203. The decoding process consists of determining one logic bits from zero logic bits while correcting for the card speed. The bits are grouped into eight bits and stored in memory. When the card is fully inserted, and is sensed by the rear card position sensor 205, which outputs a high logic level (+5V), the micro-controller 202 knows to end the decoding process. For more details on decoding time-varying bi-phase refer to U.S. Pat. No. 4,626,670, issued to Miller.

If magnetic stripe encoded data was not detected, micro-controller 202 signals micro-controller 301 to activate the RF receiver/transmitter 302 in order to test if a contact-less chip card is inserted. If detected, the contact-less chip card reader/writer electronics 30 will be left active and the slot controller 70 signaled that a chip card is present and can proceed with communications. If neither magnetic stripe encoded data nor the presence of a chip card was detected an error will be signaled indicating that a magnetic card may have been inserted incorrectly.

Unlike magnetic stripe card 60, data on contact-less chip card 80 is read when the card is fully inserted and is not in motion. All communication is performed via a radio frequency link, which provides both bi-directional communication and a source of power. When the RF receive/transmitter 302 is activated a RF (radio frequency) carrier is applied to the loop-coupling antenna 303. The power of the RF carrier is of sufficient magnitude that the current induced into loop-coupling antenna 802 in the contact-less chip card 80 will be great enough to power the chip 801. The communication to chip 801 is accomplished by modulating the carrier, typically at a 25% modulation level. The communication from chip 801 is performed in a somewhat different manner in that the chip 801 modulates the loading of the loop antenna 802. Since loop antenna 802 and loop antenna 303 actually form a loosely coupled transformer the loading by the chip 801 will be reflected back into antenna 303 such that it can be detected by the RF receive/transmitter 302.

The preferred embodiment uses two micro-controllers to more easily fit the physical shape required and to reduce the number of interconnects between boards. For other embodiments a single micro-controller can be used since the reading of the magnetic strip data is exclusive of the reading and writing a contact-less chip card, even if the card inserted possesses both technologies.

With a card fully inserted, and perhaps magnetic stripe data stored in memory, the micro-controller 202 is ready to accept commands from the slot controller 70 via the I/O interface 201. The Magnetic Stripe Reader Electronics 20 process the magnetic stripe commands received, while contact-less chip card commands are relayed on to the contact-less chip card reader/writer electronics 30 for processing.

Magnetic stripe commands and contact-less chip card reader/writer commands are distinguished from one another by the first byte (character) received. The first byte of the contact-less chip card reader/writer command set is selected not to have a value equal to any of the existing magnetic stripe commands. Typically existing magnetic stripe commands are limited to printable ASCII characters (20 to 7F hexadecimal) and a line terminator of carriage return (0D hexadecimal) and an optional linefeed (0 A hexadecimal). Therefore the new contact-less chip card reader/writer commands must start with a byte with any value, other than the values afore mentioned.

Figure 4:
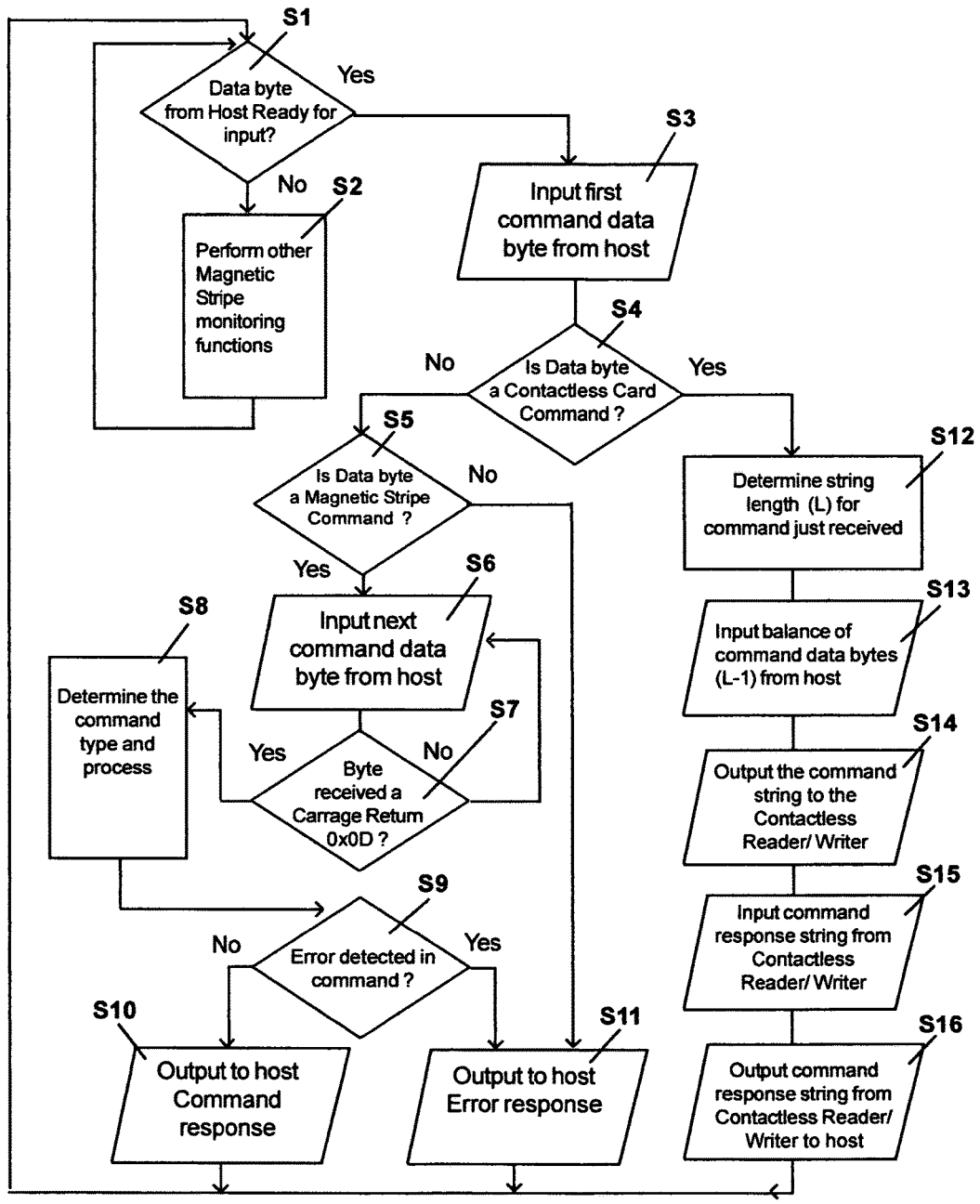
FIG. 4 shows a flow chart or the software that handles the commands from the host and determines the type and destination.

The flow of the program code in micro-controller 202 for processing the magnetic strip commands and the contact-less chip card reader/writer commands is shown in FIG. 4. A monitor loop is comprised of steps S1 and S2, in which S2 performs the time related monitoring of the magnetic strip read functions, including checking the card sensors to detect a card entering the reader and decoding the card data. While S1 checks if a character byte is ready for input, if so the character byte is input in step S3. Step S4 determines if the byte is the first byte of a contact-less chip card reader/writer command by testing if it is not 20 to 7F hex inclusive or 0D hex nor 0A hex. If the byte is not one of the values tested for, it must be a contact-less card command and the program proceeds to step S12, else it must be a magnetic card reader command and proceeds to step S5.

Step S5 further tests to see if the byte is the first byte of a command supported by the particular legacy command set being emulated, if not, the command is invalid and an error response is output in step S11. If the byte is a supported command and then the next byte is input in step S5 and is then tested in S7 to see if it is a carriage return (0D hex), if not return to step S5 to input the next byte. When the line terminator (0D hex) is detected in S7 the command can then be processed in step S8. When the command processing is complete, step S9 checks if an error has been detected during the command processing. If an error was not detected the command response is output to the slot controller 70 in step S10, otherwise an error response is output S11.

Referring back to step S4, if the first byte was not a value that could be a magnetic stripe command then step S12 determines the byte string length for the particular command just input. The first byte of contact-less chip card reader/writer commands indicates both the command function to be performed and the number bytes in the command, for a given command the byte string length is always the same. In step S12 the first byte value is used to look-up the associated length (L). With the byte string length now known, step S13 inputs the balance of the command string (L-1). Step S14 outputs to the contact-less chip card reader/writer electronics 30 the just input command string in the same order as received. When the command has been completed the response is input in step S15. Step S16 then in turn outputs the response string to the slot controller 70 in the same order as received. Error checking similar to step S9 is not required because, once it is determined that the command is not a magnetic strip command then the magnetic stripe reader electronics 20 only routes bytes to and from the contact-less chip card reader/writer electronics 30.

Other Embodiments

The embodiment disclosed above allows the use of both the legacy magnetic stripe player-tracking cards while at the same time honoring cashless gaming cards on a single system. After some period of time the system will most likely cease using the magnetic stripe cards in favor of the new cashless gaming chip card. At that point a single media reader/writer will only be needed. But the player tracking function will still be needed.

To support the player tracking data in the contact-less chip card selected data fields can be used as read only areas for player information. To further support existing slot machine controllers, which still expect a magnetic stripe reader connected, the dual command set can continue to be supported with the exception that the player information is retrieved from the contact-less card instead of from a magnetic stripe.

What is claimed is:

1. A replacement reader device capable of interfacing with a card for use in a gaming machine, the gaming machine including a gaming cabinet having a cutout, a gaming machine controller, a mounting, and a magnetic stripe card reader, the controller and magnetic stripe card reader contained in the gaming cabinet and the magnetic stripe card reader mounted on the mounting with access through the cutout, the replacement reader device for replacement of the magnetic stripe card reader mounted in the gaming cabinet, the replacement reader device comprising:
   a reader body having approximately the same dimensions as the magnetic strip card reader, the reader body mountable on the mounting within the gaming cabinet;
   magnetic stripe reader electronics comprising:
      an input/output interface in communication with the gaming machine controller when the replacement reader device is mounted in the gaming machine;
      a magnetic stripe read head configured to recover raw data from a magnetic stripe on the card;
      an amplifier, peak detector and comparator in communication with the magnetic stripe read head configured to convert the raw data from the magnetic stripe read head to logic levels;
      a first micro-controller in communication with the input/output interface and the amplifier, peak detector and comparator configured decode logic levels received from the amplifier, peak detector and comparator, and to process a first set of commands;
      card sensing means in communication with the first micro-controller configured to signal the first micro-controller when the card is detected; and
   contactless chip card reader electronics in communication with mating electronics comprising:
      an RF receiver/transmitter in communication with a loop-coupling antenna; and
      a second micro-controller configured to process a second set of commands and to communicate with the RF receiver/transmitter,
   wherein the magnetic stripe reader electronics are attached to a first board at the top or the bottom of the reader body and the contactless chip card reader electronics are attached to a second board at the bottom or top of the reader body opposite the first board; and
   a common entry slot, wherein the device is operable to read a magnetic stripe card inserted in the common entry slot, and operable to attempt to read for a magnetic strip card inserted in the common entry slot via the magnetic strip read head and to activate the RF receiver/transmitter to read a contactless chip card only when the contactless chip card is inserted into the common entry slot and after the device attempts to read for a magnetic stripe card.

2. The device of claim 1, wherein the gaming machine is a slot machine.

3. The device of claim 1, wherein the gaming machine controller is a slot machine controller.

4. The device of claim 1, wherein the card is partially inserted into the common entry slot.

5. The device of claim 1, wherein the device has the same physical dimensions as the magnetic stripe reader.

6. The device of claim 1, wherein the device has the same mounting method as the magnetic stripe reader.

7. The device of claim 1, wherein the device has the same cable connections to the gaming machine controller as the magnetic stripe reader.

8. The device of claim 1, wherein a front appearance of the device is the same as the magnetic stripe reader.

9. The device of claim 1, wherein the card has both a magnetic stripe and a contactless chip.

10. The device of claim 9, wherein the device is operable to read the magnetic stripe during insertion, and to read the contactless chip while inserted.

11. A replacement device capable of interfacing with a card for use in a gaming machine, the gaming machine including a gaming cabinet having a cutout, a gaming machine controller, a mounting, and a magnetic stripe card reader, the controller and magnetic stripe card reader contained in the gaming cabinet and the magnetic stripe card reader mounted on the mounting with access through the cutout, the replacement reader device for replacement of the magnetic stripe card reader mounted in the gaming cabinet, the replacement reader device comprising:
- a reader body having approximately the same dimensions as the magnetic strip card reader, the reader body mountable on the mounting within the gaming cabinet;
- magnetic stripe reader electronics comprising:
  - an input/output interface in communication with the gaming machine controller when the replacement reader device is mounted in the gaming machine;
  - a magnetic stripe read head configured to recover raw data from a magnetic stripe on the card;
  - an amplifier, peak detector and comparator in communication with the magnetic stripe read head configured to convert the raw data from the magnetic stripe read head to logic levels; and
  - card sensing means configured to output a signal when the card is detected;
- contactless chip card reader electronics comprising:
  - an RF receiver/transmitter in communication with a loop-coupling antenna; and
- a micro-controller in communication with the magnetic stripe reader electronics and the contactless chip card reader electronics configured to decode logic levels received from the amplifier, peak detector and comparator and to process commands from the magnetic stripe reader electronics and the contactless chip card reader/writer electronics, wherein the magnetic stripe reader electronics are attached to a first board at the top or the bottom of the reader body and the contactless chip card reader electronics are attached to a second board at the bottom or top of the reader body opposite the first board; and a common entry slot, wherein the device is operable to read a magnetic stripe card inserted in the common entry slot, and operable to attempt to read for a magnetic strip card inserted in the common entry slot via the magnetic strip read head and to activate the RF receiver/transmitter to read a contactless chip card only when the contactless chip card is inserted into the common entry slot and after the device attempts to read for a magnetic stripe card.

12. The device of claim 11, wherein the gaming machine is a slot machine.

13. The device of claim 11, wherein the gaming machine controller is a slot machine controller.

14. The device of claim 11, wherein the card is partially inserted into the common entry slot.

15. The device of claim 11, wherein the device has the same physical dimensions as the magnetic stripe reader.

16. The device of claim 11, wherein the device has the same mounting method as the magnetic stripe reader.

17. The device of claim 11, wherein the device has the same cable connections to the gaming controller as the magnetic stripe reader.

18. The device of claim 11, wherein a front appearance of the device is the same as the magnetic stripe reader.

19. The device of claim 11, wherein the card has both a magnetic stripe and a contactless chip.

20. The device of claim 19, wherein the device is operable to read the magnetic stripe during insertion, and to read the contactless chip while inserted.

* * * * *